United States Patent
Champagnon

[15] 3,707,678
[45] Dec. 26, 1972

[54] DEVICE FOR DETECTING THE INSTANTANEOUS SPEED OF ROTATION OF A MACHINE

[72] Inventor: Jean Pierre Champagnon, Avon, France

[73] Assignee: Soriete Nationale d'Etndes et de Construction de Moteurs d'Aviation, Paris, France

[22] Filed: April 28, 1970

[21] Appl. No.: 32,711

[30] Foreign Application Priority Data

April 29, 1969 France.....................6913526

[52] U.S. Cl. ................324/160, 324/175, 60/39.28, 137/81.5
[51] Int. Cl. ..............................................G01p 3/42
[58] Field of Search......324/160, 166, 167, 175, 161; 73/518, 521; 250/231 SE; 356/23, 25; 137/81.5; 60/39.28; 340/262

[56] References Cited

UNITED STATES PATENTS

| | | |
|---|---|---|
| 2,070,623 | 2/1937 | Satterlee....................324/167 |
| 3,196,279 | 7/1965 | Papelian...............250/231 SE |
| 3,531,985 | 10/1970 | Martin..................73/521 UX |
| 3,260,271 | 7/1966 | Katz......................73/521 UX |
| 3,509,773 | 5/1970 | Arnett........................137/81.5 |
| 3,559,665 | 2/1971 | Davis..........................137/81.5 |
| 3,574,475 | 4/1971 | Wolff..........................60/39.28 |

Primary Examiner—Michael J. Lynch
Attorney—William J. Daniel

[57] ABSTRACT

A detector device for detecting the instantaneous speed of rotation of a machine, e.g., a turbomachine, comprising: a disc rotated by the machine; a first signal generator producing a first signal each time said disc occupies a predetermined angular position; a second signal generator receiving the signals coming from the first generator and, each time it receives such a signal, producing a second signal; a timer device inserted between the first and second signal generators and designed to introduce a delay in the transmission of the first signal; and a device for detecting the angular position occupied, at the instant at which the second signal is emitted, by the disc, said angular position being a function of the speed of rotation of the machine.

4 Claims, 11 Drawing Figures

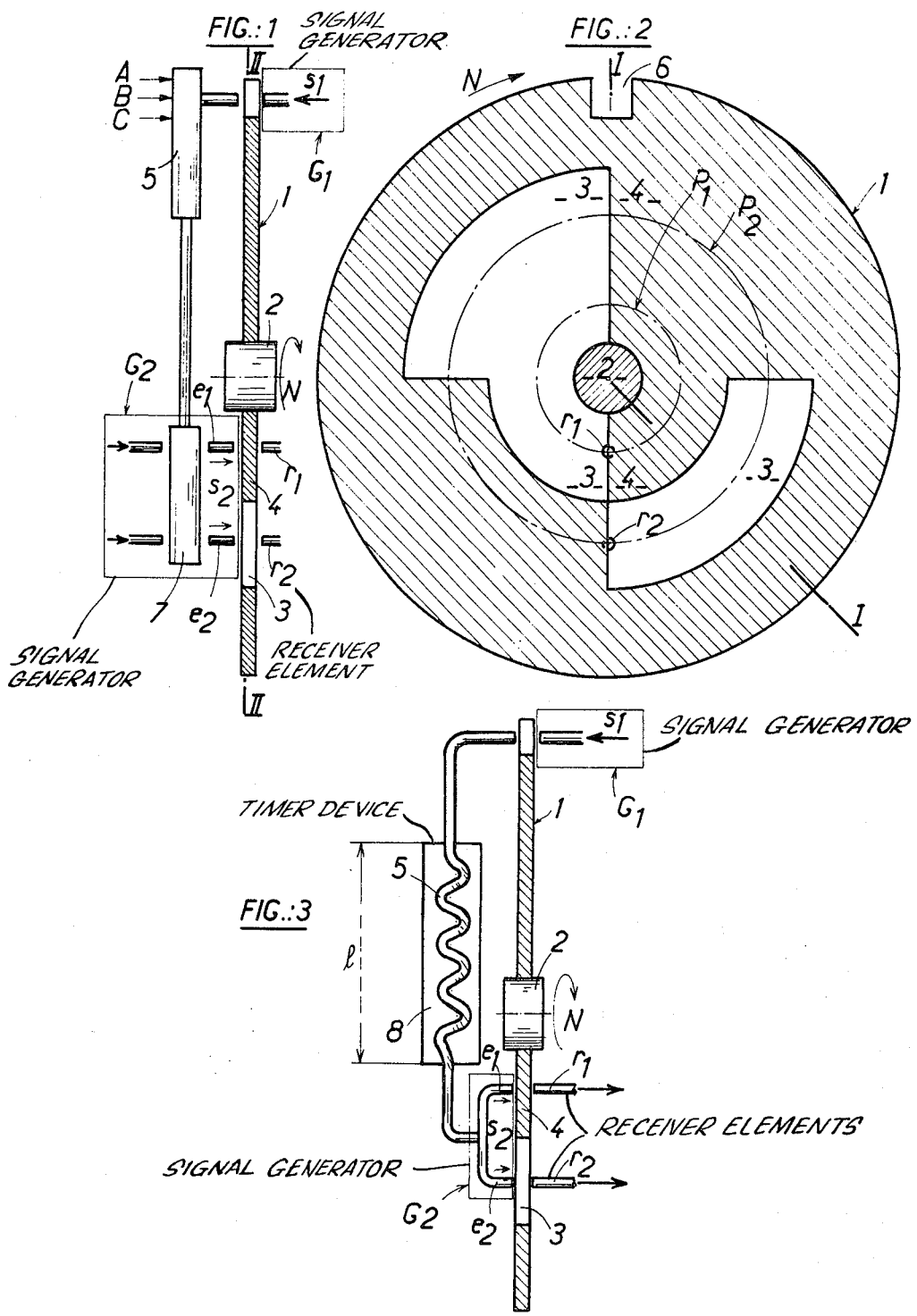

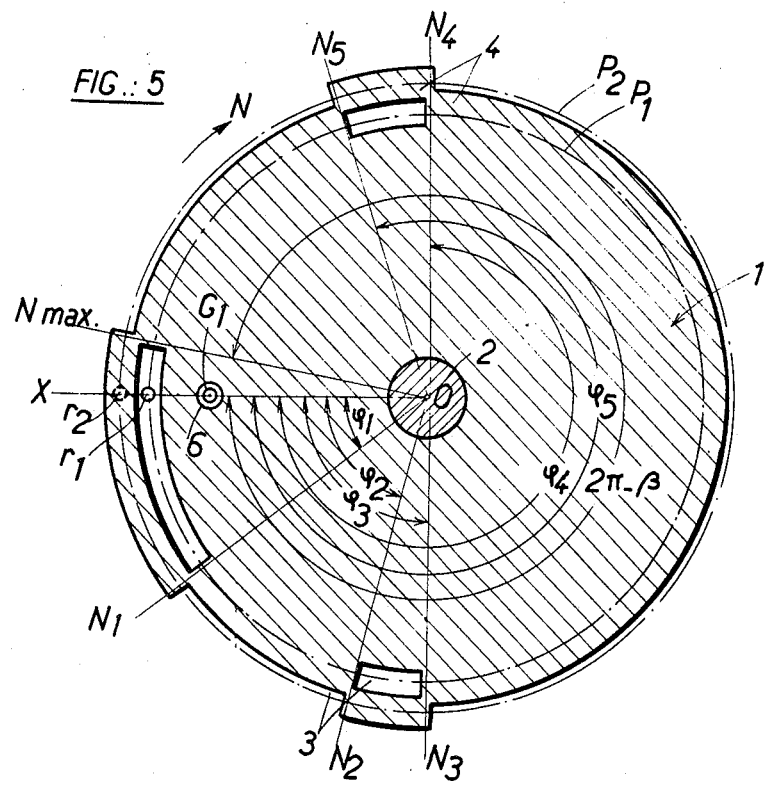
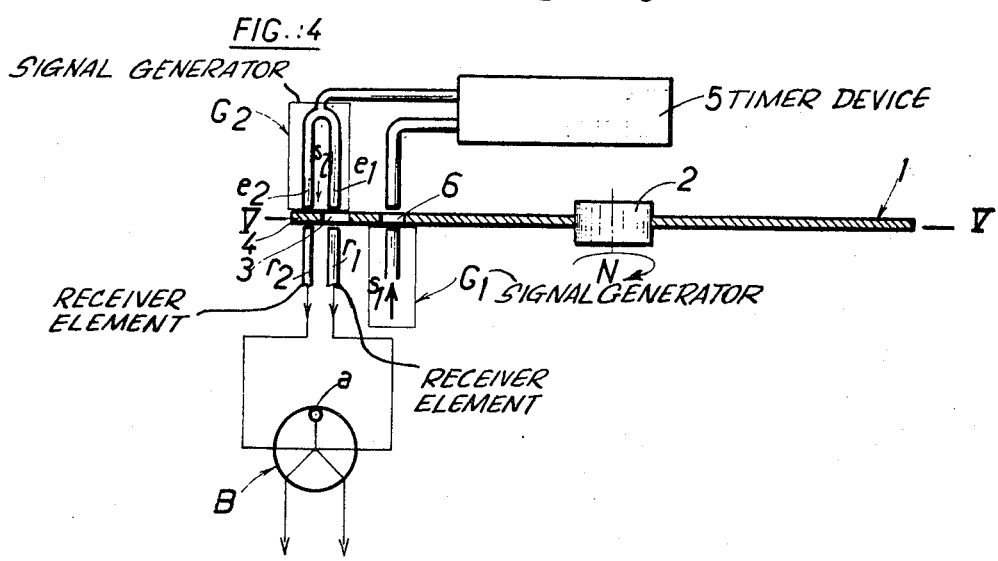

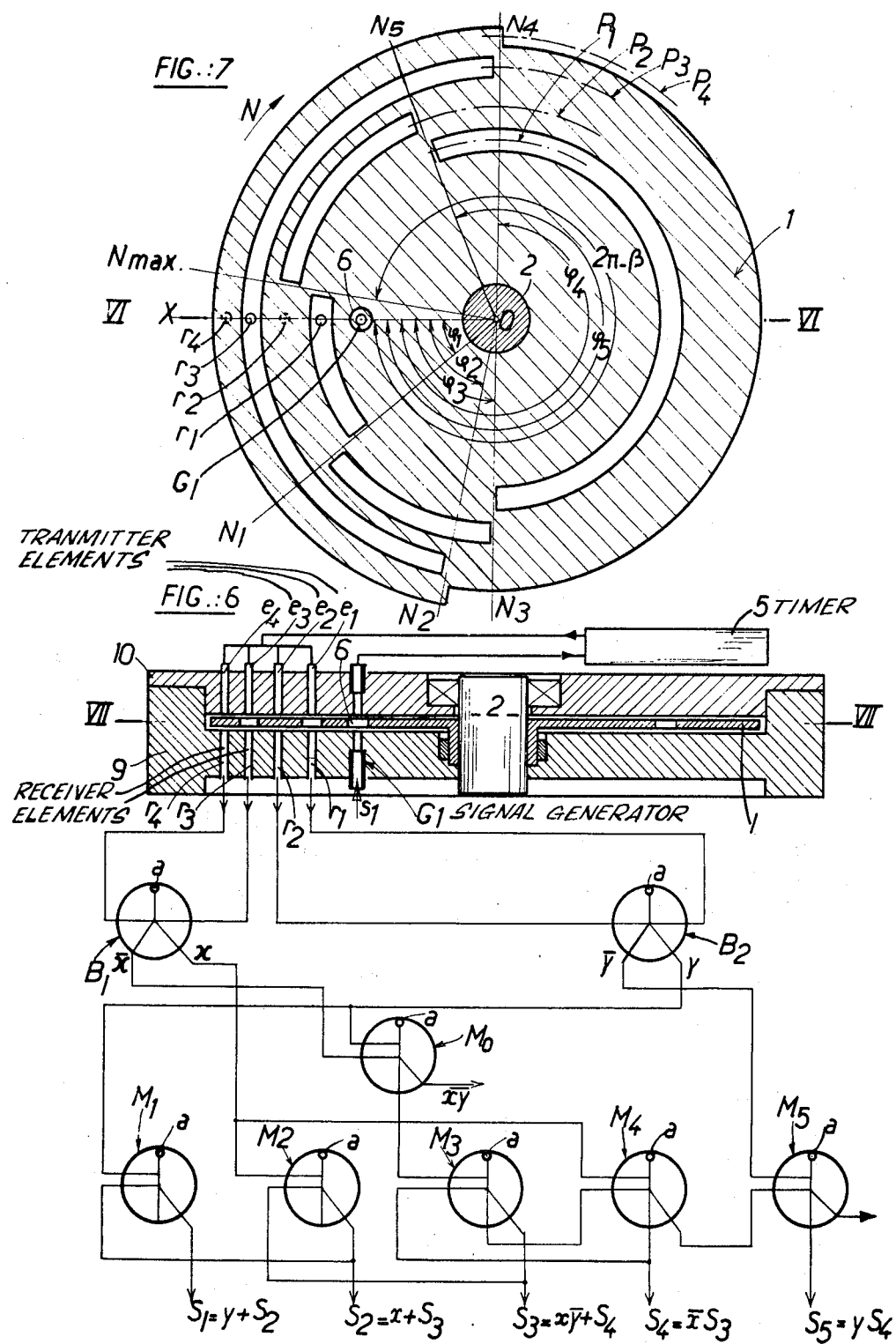

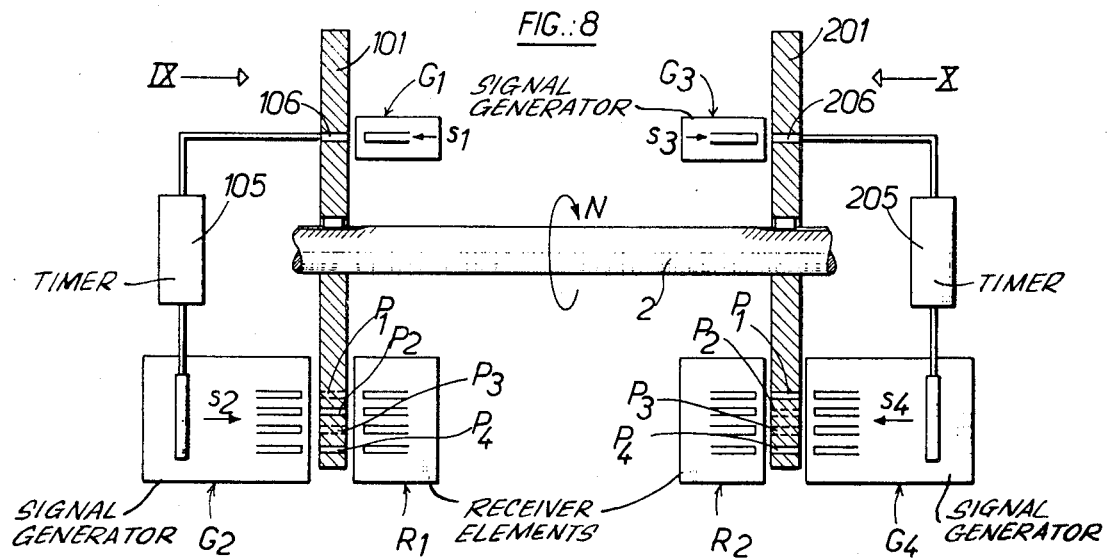
FIG.: 8
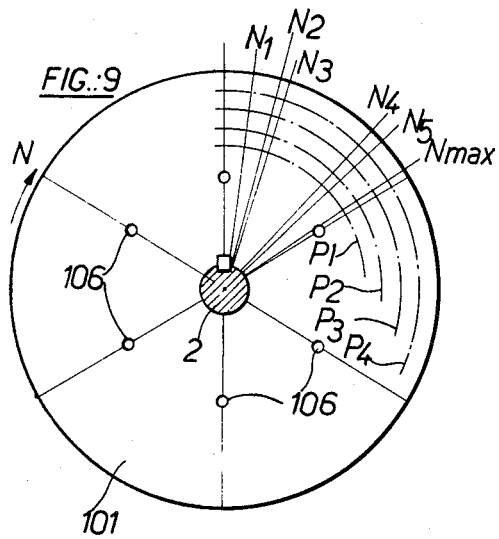
FIG.: 9
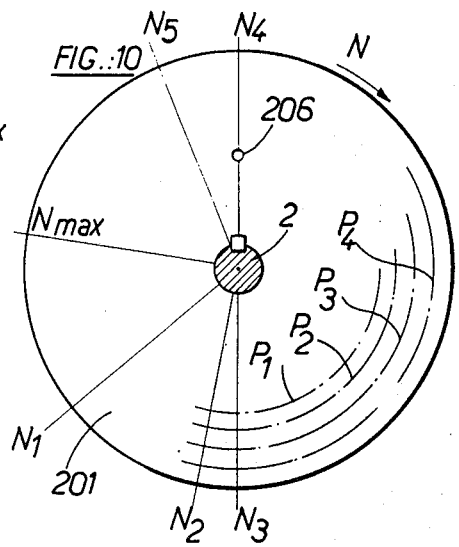
FIG.: 10
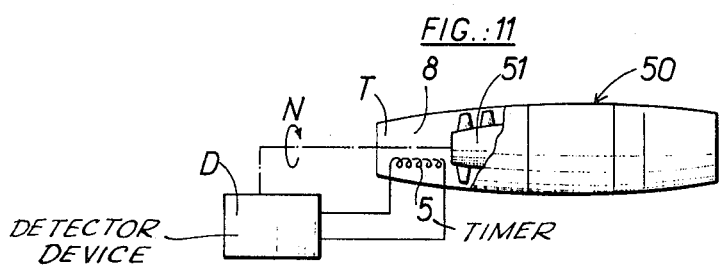
FIG.: 11

DEVICE FOR DETECTING THE INSTANTANEOUS SPEED OF ROTATION OF A MACHINE

The present invention relates to a device for detecting the instantaneous speed of rotation of a machine and is concerned with the production of a device which, compared with known kinds of speed pick-ups, exhibits the advantages of simplicity, reliability, light weight and low sales price.

It relates more particularly, albeit not exclusively, to the detection of the instantaneous speed of the rotor of a turbomachine forming part of a gas-turbine power plant and makes it possible, in accordance with a particularly advantageous embodiment, to obtain a direct indication as a function of a parameter in the form $N/\sqrt{T}$, N being the angular velocity of the rotor and T the absolute temperature of the working fluid measured at a suitable point in its passage through the power plant, more often than not the intake of a compressor forming part of said power plant.

A detector device in accordance with the invention comprises, in combination, at least one element such as a disc, rotated by the machine; a first signal generator designed in order to produce a first signal each time said element occupies a predetermined angular position; a second signal generator designed to receive the signals coming from the first generator and, each time it receives such signal, to produce a second signal; a timer device inserted between the first and second signal generators and designed to introduce delay in the transmission of the first signal; and a device for detecting the angular position occupied, at the instant at which the second signal was emitted, by the element which is rotated by the machine. The angular position thus detected is a function, as those skilled in the art will appreciate, of the speed of rotation of the machine.

In accordance with one embodiment, the timer device can be designed in order to produce in the transmission of the first signal, a delay which has a predetermined value. The indication of angular position, given by the detector device, will then be a function solely of the instantaneous speed of rotation of the machine. In accordance with another embodiment, the value of the delay can be a function of at least one other parameter in order that the indication of the angular position (and therefore of the speed), given by the device, is modulated as a function of said parameter.

The timer device can advantageously be constituted by a delay line, for example one of the electromagnetic type or, preferably, of the acoustic type. The utilization of a line of this type means, as will be explained, a very substantial advantage, in particular as far as the thermodynamics of turbomachines are concerned, as it enables simple direct modulation of the angular velocity indication by an indication which is inversely proportional to the square root of a temperature. For this purpose, it is merely necessary to arrange for the delay line to be located in an environment in which said temperature prevails.

The signals utilized can be of any arbitrary kind: acoustic, pneumatic, hydraulic, electrical, electronic etc. In accordance with the preferred embodiment, these signals are fluid signals such as pneumatic signals, whose subsequent processing can, in particular where the measurement of the rotational speed of a turbomachine is concerned, be effected within conditions of greater reliability than those offered by equivalent electronic installations.

In accordance with one embodiment of the invention, the detection of the instantaneous angular position of the element or disc driven by the machine, is effected in an analogue manner. To this end, the detector device can advantageously comprise means for measuring an analogue quantity which is a function of the angular or circumferential displacement of a point on said element between the time at which the first signal is produced, and the time at which the second signal is produced. This analogue quantity can, for example, be an electrical resistance, inductance, a capacitance, a pressure etc. etc.

Preferentially, however, and in accordance with another embodiment of the invention, this detection function will be effected digitally. The element which is rotated by the machine can then, to this end, be divided into a plurality of sectors to each of which there corresponds a coded quantity. These sectors successively pass in front of at least one fixed receiver element forming part of the device responsible for detecting the angular position of said element, said device comprising means which are sensitive to the coded quantity which corresponds to that of the sectors which, at the instant of emission of the second signal, is located opposite said receiver element. The element which is rotated by the machine may, for example, comprise sections which are respectively transparent and opaque to the second signal and are distributed in accordance with a binary code and in a varying fashion from one sector to the next, and it can be arranged that said second signal has to pass through said element or disc prior to arriving at the receiver element so that it is subjected, before it does so arrive, to a modulation which is a function of the coding of that of the sectors which, at the instant of emission of the second signal, is located between the second signal generator and the receiver element.

These transparent and opaque portions can advantageously be distributed along several circumferential, concentric tracks upon each of which they form alternately transparent and opaque arcs, a receiver element being associated with each of said tracks. The successive sectors of the element rotated by the machine, thus correspond in each case to a speed range which can be made as fine as required by multiplying the number of tracks. These sectors can subtend equal angles at the center, corresponding thus to equal speed ranges. In accordance with an embodiment which is preferred in certain applications, these angles subtended at the center may differ from one another. They then correspond to dissimilar speed ranges separated from one another by predetermined critical speeds which can readily be detected with the help of a sequential decoding logic circuit supplied by the receiver elements and producing, for each successive range, a characteristic and predetermined signal.

In accordance with another embodiment, the device in accordance with the invention comprises at least two driven elements or discs, each rotated by the machine and designed respectively for the scanning of the low-speed range and the high speed range, of the machine each of said elements being associated with a first signal generator, with a second signal generator and with a timer device. The first signal generator associated with the low-speed disc or element, will then advantageously be designed to produce, with each revolution, of the machine a greater number of signals than the first generator associated with the other element. This arrangement has the advantage of making it possible to adjust the timer device which cooperates with the low-speed element in order to impose upon the signal passing through it, a shorter delay than that which is imposed upon the signal passing through the timer device associated with the other element. Thus, in the low-speed range, the response time of the installation is shortened.

The description which now follows in relation to the attached drawing, given here by way of a non-limitative example, will indicate how the invention may be put into effect.

FIG. 1 is a schematic sectional view, on the line I—I of FIG. 2, of a detector device in accordance with the invention for detecting the instantaneous speed of rotation of a machine.

FIG. 2 is a sectional view, on the line II—II of FIG. 1, of said device.

FIG. 3 is a view, similar to that of FIG. 1, of a detector device in accordance with a first variant embodiment.

FIG. 4 is a similar view to that of FIG. 1, of a detector device in accordance with a second variant embodiment.

FIG. 5 is a sectional view, in accordance with the line V—V of FIG. 4, of the device in accordance with said variant embodiment.

FIG. 6 is a sectional view, on the line VI—VI of FIG. 7, of a detector device in accordance with a third variant embodiment.

FIG. 7 is a sectional view, on the line VII—VII of FIG. 6, of the device in accordance with said variant embodiment.

FIG. 8 is a schematic view of a detector device in accordance with a fourth variant embodiment.

FIG. 9 is a partial view of said fourth variant embodiment taken in the direction of the arrow IX.

FIG. 10 is a partial view of said fourth variant embodiment taken in the direction of the arrow X.

FIG. 11 is a diagrammatic view of a gas turbine power plant equipped with a detector device in accordance with the invention.

In FIGS. 1 and 2, the reference 1 has been used to indicate an element in the form of a disc fixed to a shaft 2 rotated by a machine (not shown) at a speed whose instantaneous value N is to be detected, either for the purpose of information or in order to control other operating parameters of the machine. The machine may for example be a turbomachine, in particular a compressor, forming part of a gas-turbine power plant such as a turbojet engine.

The element 1, which we will refer to in the following by the name of "disc," is divided into a plurality of sectors, in the present instance four, with each of which there corresponds a coded quantity characteristic of the particular sector. To this end, the disc comprises, distributed in accordance with a binary code and in a fashion which varies from one sector to the next, portions which are respectively transparent, such as 3, and opaque such as 4, to those signals such as those $s_1$ and $s_2$, which will be referred to hereinafter. These portions will advantageously be distributed over several circumferential and concentric tracks upon each of which they form alternately transparent and opaque arcs. In the example illustrated, these tracks are two in number. As FIG. 2 shows, the first track, marked $P_1$, is divided into two arcs, one transparent and the other opaque, while the second track, marked $P_2$, is divided into four arcs which are again alternately transparent and opaque. This distribution thus makes it possible to distinguish on the disc 1, four 90° sectors each characterized by a particular configuration. If, through the thus coded disc, an appropriate signal is transmitted, the resultant signal after transit through the disc will be modulated as a function of the coding of that of the sectors which was traversed by the signal. If, we respectively designate the two possible responses vis-a-vis the signal (transparency of opacity), by the digits 1 and 0, that is to say the responses of each of the track arcs contained in a sector, then there will correspond with each sector a characteristic binary number, in the present instance 11 for the first quadrant, 10 for the second quadrant, 01 for the third and 00 for the fourth. It will be understood, therefore, that we thus have a means of detecting the angular position of the disc 1, in the present instance to an accuracy of one-quarter of the revolution. In order to increase the accuracy of detection, the number of tracks can be multiplied by doubling the number of arcs each time transit from one track to the next is made, the track of $n^{th}$ order thus being divided into $2^n$ arcs. In this fashion, one very soon arrives, and indeed with a relatively small number of tracks, at a high degree of accuracy, for example, in the order of one-thousandth, with a 10-track disc.

In accordance with the invention, there are associated with the thus coded element of disc, two signal generators $G_1$ and $G_2$ connected with one another by an appropriate transmission line in which there is arranged a timer device or delay line, 5. The signals in question may be of arbitrary kind, for example electrical or electronic, hydraulic or pneumatic, acoustic or optical. As far as the timer device or delay line is concerned, it may be of any conventional kind, for example electromagnetic or acoustic, and it enables the signal $s_1$ to be delayed by an appropriate time.

The signal generator $G_1$ is designed to produce a signal $s_1$ each time, during its rotation, the disc 1 occupies a predetermined angular position which by convention is adopted as the origin. It is possible, for example, to arrange that the emission of said signal is produced by the position of the disc itself. To this end, and as FIGS. 1 and 2 show, the disc 1 comprises at least one portion 6 transparent to the energy produced by the generator $G_1$ so that each time the said portion is located opposite the generator $G_1$, a signal $s_1$ is transmitted and arrives at the input of the timer device 5.

The signal generator $G_2$ is designed to receive the signals $s_1$ coming from the generator $G_1$, suitably delayed, and in turn to produce, each time it receives such a signal, a second signal $s_2$. As FIG. 1 shows, the emission of the signal $s_2$ can be triggered by the provision of an appropriate gate 7 to which the signal $s_1$ is applied, but this arrangement is in no way obligatory and the signal $s_2$ could equally well be constituted by the signal $s_1$ as it appears at the output of the timer device.

As FIG. 1 shows, the signal generator $G_2$ comprises two elementary transmitter elements $e_1$, $e_2$ arranged opposite the disc 1 and at a distance from the axis 2 corresponding respectively to the radii of the tracks $P_1$ and $P_2$ formed on the disc. Opposite these transmitter elements, at the other side of the disc, there are respectively located receiver elements $r_1$ and $r_2$ so that each time a signal $s_2$ is transmitted to the elements $e_1$ and $e_2$, there is picked up at the elements $r_1$ and $r_2$ a coded signal which is a function of the angular position of the disc.

If the time axis origin is adopted as being the instant at which the signal $s_1$ is emitted, and if we call $t$ the delay imposed upon the transmission signal $s_1$, by the timer device 5, the coded signal picked up at the receiver elements $r_1$ and $r_2$ will therefore be a function of the variation in angular position of the disc 1 during the time $t$, in other words of the angular velocity N thereof.

The foregoing description relates to a device in which the angular position of the disc is detected by digital means, that is to say by introducing discontinuous coded quantities. However, it is evident that it is equally possible to employ the measurement of an analogue quantity which will be a continuous function of the angular or circumferential displacement of a point on the disc, between the instant at which the first signal was emitted and the instant at which the second signal was emitted. Thus, it will be possible to associate with this displacement a variation in resistance, inductance, capacitance, pressure, etc. etc.

An interesting feature of the invention resides in the fact that the delay time $t$ imposed in the transmission of the signal $s_1$ by the timer device and, consequently, the measurement time, can be modified as a function of the values of one or more parameters, in particular environmental ones such as A, B, C (see FIG. 1). The result is that the angular position of the signal received at the receiver elements $r_1$ and $r_2$ (or $r_1, r_2 \ldots r_n$ in the case of a disc having $n$ tracks), is a function not only of the speed of rotation N but also of said parameters A, B, C.

A variable often employed in the context of the thermodynamics of gas-turbine power plants, is the quantity $N/\sqrt{T}$, in which expression T designates the absolute temperature at an appropriate point in the fluid flow passing through the plant, preferably at the intake of a compressor forming part of said plant. The detector device in accordance with the invention makes it possible in a particularly simple manner, to obtain a signal which is a function of this quantity.

FIG. 3 illustrates an example of such an embodiment. The timer device 5 used, which is supplied with a signal $s_1$, preferably a pneumatic signal, is constituted in this case by an acoustic delay line, that is to say a line in which the transmission of the signal is effected at the speed of sound. The time $t$ (measurement time), is thus the time taken by the signal to travel through the line between the signal generators $G_1$ and $G_2$. This time is a function of the length of the line and of the speed of sound through the fluid through which the signals are transmitted, this characteristic speed depending, as those skilled in the art will appreciate, upon the nature of the fluid used and upon the environmental conditions to which it is subjected. In the case of a gas, in particular air, the speed of sound V is given by the relationship $$V = \sqrt{\gamma RT}$$

in which $\gamma$ represents the ratio of the specific heats of gas at constant pressure and constant volume respectively, while R and T respectively designate the gas constant and the absolute temperature of said gas.

If we call $l$ the length of the delay line, the time $t$ taken for transit through this line, will be determined by the expression $t = l/v$, from which we can write $$t = l/\sqrt{\gamma RT}.$$

If we call $\alpha$ the annular displacement of the disc 1 during the time $t$, we can therefore write :

$$\alpha = Nt = \frac{Nl}{\sqrt{\gamma RT}} = K\frac{N}{\sqrt{T}}$$

The detector device in accordance with the invention is thus appropriate to the production, in a remarkably simple manner, of an indication which is a function of a parameter $N/\sqrt{T}$. It is merely necessary, therefore, to immerse the delay line 5 in an enclosure 8 in which the temperature $T$ prevails, for example the intake of the above mentioned compressor. FIG. 11 shows diagrammatically such a detector device D as applied to a gas turbine power plant 50 including a compressor rotor 51.

The example which has just been described is not, however, in any way limitative of the scope of the invention and other processes are readily conceivable, for example electronic ones, which could modify the delay produced by the timing device, as a function of $1/\sqrt{T}$.

The speed detector which has just been described finds a particularly interesting application in the detection of special operating conditions, in which situations it can produce control signals, for example pneumatic ones. For instance, at the time of start-up of an engine, different operations (sequences of engine starting, for example) are often necessary and have to be gone through in a predetermined order. FIGS. 4 to 7 relate to this aspect of the invention.

Let us suppose that it is required, for example, to detect five successive speed ranges separated from one another by critical speeds such as $N_1, N_2, N_3, N_4, N_5$. As FIG. 5 shows, the disc 1 is divided into sectors of angle $\phi_i$ of the same origin OX and proportional to the speeds $N_i$ which are to be detected. The proportionality factor is selected so that the maximum speed $N_{max}$ which is to be detected, corresponds to an angle $2\pi - \beta$ which is slightly less than $2\pi$ so that, taking into account the slight variations which are always possible in $N_{max}$, the scanning of a speed range slightly higher than the mean value of $N_{max}$, is always possible. With each critical speed $N_i$, there thus corresponds an angle $\phi_i$ given by the expression $$\phi_i = \frac{N_i}{N_{max.}}(2\pi - \beta)$$

The delay $t$ introduced by the timer device is arranged to correspond to the time required to sweep the angle $2\pi - \beta$ at the speed $N_{max}$. If N is expressed in r.p.m. and $t$ in ms., we can thus write $$t = \frac{2\pi - \beta}{2\pi} \times \frac{60000}{N_{max.}}$$

It will be observed that the speed ranges considered can be dissimilar, so that the angles subtended at the center, such as $\phi_3 - \phi_2$, $\phi_4 - \phi_3$, etc. etc., and corresponding to these ranges, are also dissimilar.

It sometimes happens that it is sufficient to detect the simple fact that the engine has just left one speed range, without actually having to show in which direction this change has taken place. In this case, a simplified detection device of the kind schematically illustrated in FIGS. 4 and 5 can be used.

In this case, the disc 1 carries two tracks $P_1$ and $P_2$ cooperating, as we have seen, with two signal generators $G_1$ and $G_2$ interconnected through the medium of a timer device 5. The alternately transparent and opaque arcs which constitute the two tracks are distributed in such a manner as to produce extremely simple coding since with each of the speed ranges defined between two successive critical speeds, there can only correspond a single binary signal, of the 10 or 01 kind. This binary signal can be decoded by means of a bistable trigger circuit B, for example a fluid-type circuit (supplied at A), producing a resultant signal S whose successive values have been plotted in the following table:

| $\phi_t$ | 0 | $\phi_1$ | $\phi_2$ | $\phi_3$ | $\phi_4$ | $\phi_5$ | $2\pi-\beta$ | $2\pi$ |
|---|---|---|---|---|---|---|---|---|
| $N_t$ | 0 | $N_1$ | $N_2$ | $N_3$ | $N_4$ | $N_5$ | $N_{max.}$ | |
| S | 0 | 1 | 0 | 1 | 0 | 1 | | 0 |

This sole output signal is, however, generally insufficient since it gives no indication of the direction of the speed change.

FIGS. 6 and 7 relate to improvements in the aforedescribed device which are intended to eliminate the drawback just described.

A disc 1 then carries four tracks $P_1$, $P_2$, $P_3$, $P_4$ with each of which there is associated the receiver element $r_1$, $r_2$, $r_3$, $r_4$, similar to the receiver elements $r_1$ and $r_2$ fitted to the devices hereinbefore described. The alternately transparent and opaque arcs which make up the tracks are distributed in accordance with a code made up of four binary elements, for example in the manner set out in the table hereinafter:

| $\phi_t$ | 0 | $\phi_1$ | $\phi_2$ | $\phi_3$ | $\phi_4$ | $\phi_5$ | $2\pi-\beta$ | $2\pi$ |
|---|---|---|---|---|---|---|---|---|
| $N_t$ | 0 | $N_1$ | $N_2$ | $N_3$ | $N_4$ | $N_5$ | $N_{max.}$ | |
| $P_1$ | 1 | 0 | 0 | 1 | 1 | 0 | | 1 |
| $P_2$ | 0 | 1 | 1 | 0 | 0 | 1 | | 0 |
| $P_3$ | 1 | 1 | 0 | 0 | 1 | 1 | | 1 |
| $P_4$ | 0 | 0 | 1 | 1 | 0 | 0 | | 0 |

It will be observed that the radial vector 0 or $2\pi$ does not correspond to a border between two sectors.

The four receiver elements $r_1$, $r_2$, $r_3$, $r_4$ have associated with them a sequential decoding logic circuit, which produces, for each speed range, a predetermined output signal. In the example illustrated, this logic circuit comprises two bistable trigger stages $B_2$ and $B_1$ controlled in the one case by the signals coming from the receiver elements $r_1$, $r_2$ and in the other by the signals coming from the receiver elements $r_3$, $r_4$, and six monostable trigger circuits $M_0$ to $M_5$ connected to the outputs of the bistable trigger circuits or to their common outputs. These elements will advantageously be of the fluidic kind and their fluid supplies schematically indicated by the top round point marked by the reference $a$.

If we use the references $x$, $\bar{x}$, $y$, $\bar{y}$ to respectively designate the binary variables associated with the two bistable trigger circuits, it will be seen that the output signal produced by the intermediate monostable circuit is $x\bar{y}$. With each of the monostable circuits $M_1$ to $M_5$, there thus corresponds an output signal $S_1$ to $S_5$ which is determined by the following relationships:

$S_1 = y + S_2$
$S_2 = x + S_3$
$S_3 = x\bar{y} + S_4$
$S_4 = \bar{x}S_3$
$S_5 = yS_4$ In these expressions, $\bar{x}$ and $\bar{y}$ are respectively the binary variables which form the complements of $x$ and $y$, the sign $+$ is the boolean addition symbol, and an expression such as $yS_4$ represents the boolean product (intersection) of the two variables 03y and $S$.

The logic table below illustrates the setting out of the signals $S_1$ to $S_5$ corresponding to the successive speeds $N_1, N_2, N_3, N_4, N_5$:

|  | $N_1$ | $N_2$ | $N_3$ | $N_4$ | $N_5$ |
|---|---|---|---|---|---|
| $x$ | 0 | 0 | 1 | 1 | 0 | 0 |
| $y$ | 0 | 1 | 1 | 0 | 0 | 1 |
| $S_1$ | 0 | 1 | 1 | 1 | 1 | 1 |
| $S_2$ | 0 | 0 | 1 | 1 | 1 | 1 |
| $S_3$ | 0 | 0 | 0 | 1 | 1 | 1 |
| $S_4$ | 0 | 0 | 0 | 0 | 1 | 1 |
| $S_5$ | 0 | 0 | 0 | 0 | 0 | 1 |

As the above table indicates, the design of the four tracks and the two bistable trigger circuits is such that, at the time of transfer from one speed range to the next, only one of the binary variables $x$ or $y$ actually varies, but it is evident that other systems of four tracks and two bistable circuits are conceivable, each having their own particular disc layout, logic table and logic circuits.

The successive signals $S_1$ to $S_5$ can, as those skilled in the art will appreciate, be used to control the starting sequences of the engine with which the detector device described is associated.

Hereinafter, a concrete example of the division of a disc into sectors, is listed:

|  | $N_t$ (t/mn) | $t_t$ (ms) | $\phi_t$ (°) |
|---|---|---|---|
| $N_1$ | 490 | 122.4 | 37.5 |
| $N_2$ | 925 | 65 | 76.5 |
| $N_3$ | 1075 | 56 | 89 |
| $N_4$ | 3250 | 18.5 | 268 |
| $N_5$ | 3500 | 17.1 | 290 |
| $N_{max.}$ | 4250 | 14.1 | 352 ($\beta = 8°$) |

In this table, $t_t$ designates the time in ms taken by the disc to execute one revolution, or in other words to revolve 360°. It will be seen that this time is equal to 14.1 ms at the maximum speed $N_{max}$. From this, the value $t$ of the delay which must be produced by the timer device is given by:

$$t = 14.1 \times \frac{352}{360} = 13.8 \text{ ms.}$$

We can therefore calculate, for example in the case of an acoustic delay line, the length $l$ of the line assuming that the speed of sound is equal to 340 m/s:

$$l = \frac{340 \times 13.8}{1000} = 4.67 \text{ m.}$$

FIG. 6 illustrates a more detailed embodiment of the detector device in accordance with the invention. It can be seen that the disc 1 is located in a housing closed by two covers 9 and 10. The transmitter elements $e_1$, $e_2$, $e_3$, $e_4$ and the receiver elements $r_1$, $r_2$, $r_3$, $r_4$ are constituted by noozzles suitable for the transfer of pneumatic signals, whose diameter is for example in the order of 1.2 mm. The signal generator $G_1$ likewise takes the form of a nozzle, this time of larger diameter, for example in the order of 3 mm.

The fluidic logic circuit which has just been described, can also be supplemented by signal regenerator or amplifier elements (monostable arrangements). It will be observed too, that the overall circuit is one which can easily be produced in integrated form.

The response time of the logic circuit is in the order of some few ms. It is consequently negligible in relation to the inherent response time of the method of detection used here, which response time is equal to the delay $t$ introduced by the timer device and corresponds, as we have seen, to one period of rotation of the disc at the maximum speed $N_{max}$.

If the range of speeds to be detected is too wide, it may be a good idea to use at least two separate elements of discs, one being designed to scan the low-speed range and the other the high-speed range of the machine. Such an arrangement is shown in FIGS. 8, 9 and 10.

A first or low-speed disc 101 is associated with a first signal generator $G_1$ adapted to emit a first signal $s_1$ each time a portion 106 of said disc occupies a predetermined angular position. A second signal generator $G_2$ is adapted to receive the signals coming from the first signal generator $G_1$ and, each time it receives such a signal, to emit a second signal $s_2$. A first timer device 105 is inserted between the signal generators $G_1$ and $G_2$ and is adapted, as already explained, to introduce a delay in the transmission of the first signal $s_1$. A device $R_1$ detects the angular position occupied, at the instant at which the signal $s_2$ is emitted, by the first disc 101.

A second or high-speed disc 201 is associated with a third signal generator $G_3$ adapted to emit a third signal $s_3$ each time a portion 206 of said disc occupies a predetermined angular position. A fourth signal generator $G_4$ is adapted to receive the signals coming from the third signal generator $G_3$ and, each time it receives such a signal, to emit a fourth signal $s_4$. A second timer device 205 is inserted between the signal generators $G_3$ and $G_4$ and is adapted to introduce a delay in the transmission of the third signal $s_3$. A device $R_2$ detects the angular position occupied at the instant at which the signal $s_4$ is emitted by the second disc 201.

In the low-speed range, there is sufficient time to scan the position of disc 101 several times per revolution of the machine. Advantageously, therefore, it can be arranged that the first signal generator $G_1$ associated with the low-speed disc 101, produces with each revolution of the machine a greater number of signals than the third signal generator $G_3$ associated with the high-speed disc 201. For example, the angular position of the low-speed disc 101 can be sampled six times per revolution and that of the other disc 201 only once per revolution. To this end, a low-speed disc 101 can be used which has $p$ (for example, six) transparent portions like the portion 106, whose passage in front of the first signal generator $G_1$ determines the instant at which measurement commences. This disc will therefore be divided into $p$ identical sectors each of which is itself subdivided into sub-sectors of angle $\phi_j$, this angle being proportional to the angular speeds $N_j$. This arrangement has been schematically shown in FIG. 9. On the other hand, the high-speed disc 201 has only one transparent portion 206, whose passage in front of the third signal generator $G_3$ determines the instant at which measurement commences (see FIG. 10).

Advantageously also, the first timer device 105 associated with the low-speed disc 101 can be designed to impose upon the signal $s_1$ which passes through it a delay which is shorter than the delay imposed upon the signal $s_3$ passing through the second timer device 205 associated with the high-speed disc 201. In the selected example, this delay (and consequently, the responsive time of the detector device) will therefore be divided by 6.

I claim:

1. A detector device for detecting the instantaneous speed of rotation of a rotating machine comprising: a first element and a second element each rotated by the machine at a speed proportional to the machine speed and designed respectively for the scanning of a low-speed range and a high-speed range of said machine; a first signal generator adapted to emit a first signal when said first rotating element occupies a predetermined angular position; a second signal generator adapted to receive the signals coming from the first signal generator and, upon receipt of such a signal, to emit a second signal; a first timer device interposed between the first and the second signal generators and adapted to delay the transmission of the first signal between said generators; a device for detecting the angular position occupied, at the instant at which the second signal is emitted, by said first rotating element, a third signal generator adapted to emit a third signal when said second rotating element occupies a predetermined angular position; a fourth signal generator adapted to receive the signals coming from the third signal generator and, upon receipt of such a signal, to emit a fourth signal; a second timer device interposed between the third and the fourth signal generators and adapted to delay the transmission of the third signal; and a device for detecting the angular position occupied, at the instant at which the fourth signal is emitted, by said second rotating element; said first signal generator being designed to produce, with each revolution of the rotating machine, a greater number of signals than the third signal generator; and said first timer device being designed to impose upon the first signal a delay which is shorter than the delay imposed upon the third signal by the second timer device.

2. In a turbomachine adapted to pass a gas flow and including a rotor, a fluidic detector device for detecting the instantaneous corrected speed $N/\sqrt{T}$ of the rotor, wherein N is the instantaneous speed of rotation of the rotor and T the absolute temperature prevailing in a predetermined zone in the gas flow, said detector device comprising: at least one element rotated at a speed proportional to the rotor speed, said element being divided into a plurality of sectors each corresponding to a coded quantity with successive sectors subtending at the center dissimilar angles corresponding to dissimilar corrected speed ranges separated from one another by predetermined critical corrected speeds, a first fluidic signal generator adapted to emit a first fluidic signal when said element occupies a predetermined angular position; a second signal generator adapted to receive the fluidic signals coming from the first generator and, upon receipt of such a signal, to emit a second signal; an acoustic delay line interposed between the first and the second signal generators and adapted to delay the transmission of the first signal between said generators, said delay line being exposed to the gas flow in said zone; and fixed receiver means disposed behind said rotated element so that the element sectors pass successively before said receiver means, said receiver means including means sensitive to said coded quantity corresponding to the sector which, at the instant of emission of the second signal, is in position aligned with said receiver means.

3. A detector device as claimed in claim 2 wherein said receiver means supply a sequential decoding logic circuit producing, for each corrected speed range, a determinate output signal.

4. In a turbomachine adapted to pass a gas flow and including a rotor, a fluidic detector device for detecting the instantaneous corrected speed $N/\sqrt{T}$ of the rotor, where N is the instantaneous speed of rotation of the rotor and T the absolute temperature prevailing in a predetermined zone in the gas flow, said detector device comprising: at least one element rotated at a speed proportional to the rotor speed; a first fluidic signal generator adapted to emit a first signal when said element occupies a predetermined angular position; a second signal generator adapted to receive the fluidic signals coming from the first generator and, upon receipt of such a signal, to emit a second signal; an acoustic delay line interposed between the first and the second signal generators and adapted to delay the transmission of the first signal between said generators, said delay line being exposed to the gas flow in said zone; said rotated element being angularly divided into a plurality of sectors and comprising, distributed thereon in accordance with a binary code and in a manner which varies from one sector to the next, portions which are respectively transparent and opaque to said second signal, said transparent and opaque portions being distributed over several separate circumferential and concentric tracks within which they form alternately transparent and opaque arcs; and a fixed receiver element associated with each of said tracks, said fixed receiver element being located in alignment with said second signal generator on the opposite side of said rotated element in order that signals produced by said second signal generator have to pass the thickness of said rotated element before reaching the corresponding receiver element, whereby the second signal is subjected to a modulation which is a function of the coding of that sector in alignment at the time of emission of such signal with said receiver elements, said receiver elements including means sensitive to the thus coded signal.

* * * * *